March 29, 1938.                E. R. GONZALES                 2,112,398
                          AEROPLANE LANDING GEAR
                    Original Filed Sept. 5, 1935    2 Sheets-Sheet 1

Inventor
E. R. Gonzales
By Clarence A. O'Brien
Attorney

March 29, 1938. E. R. GONZALES 2,112,398
AEROPLANE LANDING GEAR
Original Filed Sept. 5, 1935 2 Sheets-Sheet 2
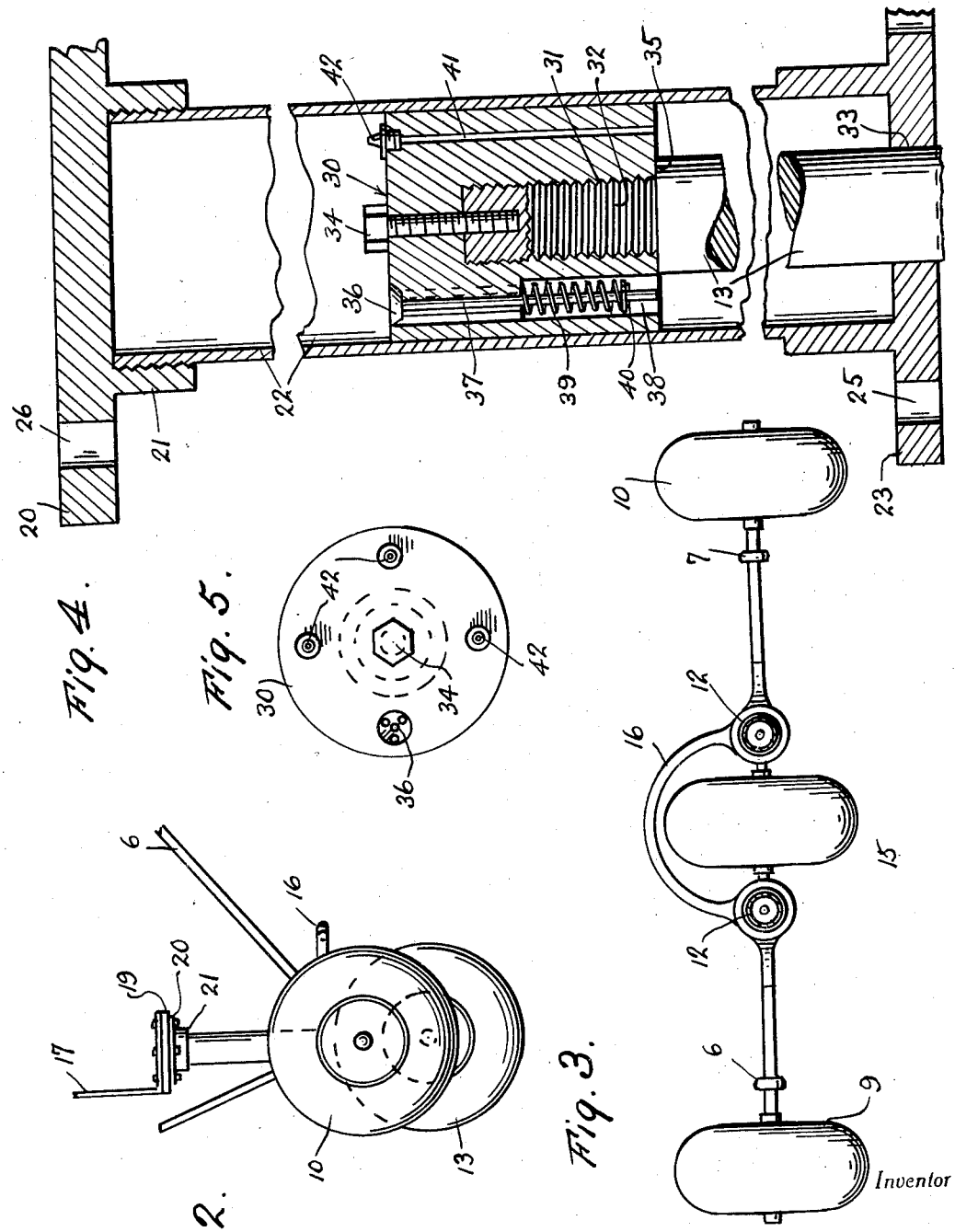
Inventor
E. R. Gonzales
By Clarence A. O'Brien
Attorney Patented Mar. 29, 1938

2,112,398

UNITED STATES PATENT OFFICE 2,112,398

AEROPLANE LANDING GEAR

Esteban R. Gonzales, El Paso, Tex.

Application September 5, 1935, Serial No. 39,342
Renewed May 28, 1937

4 Claims. (Cl. 244—104)

My invention relates generally to landing gear for heavier-than-air craft, and particularly to a landing gear involving besides the usual pair of transversely spaced landing wheels, an intermediate auxiliary landing wheel arrangement, and an important object of the invention is to provide an arrangement of the character indicated which materially reduces the landing shock to the aeroplane or the like, renders landing on a rough surface easier and safer, and makes all landings more secure and stabilized.

Another important object of my invention is to provide an auxiliary hydraulically controlled landing gear arrangement, which is simple and efficient, is easily and effectively adjustable for different weights of planes, and which does not offer great wind-resistance.

Other important objects of my invention will be apparent from a reading of the following description in connection with the drawings, wherein for purposes of illustration I have shown a preferred embodiment of my invention.

In the drawings:—

Figure 2 is a side elevational view of the lower part of Figure 1 taken from the right of Figure 1.

Figure 3 is a horizontal sectional view taken through the lower part of Figure 1.

Figure 4 is an enlarged transverse vertical sectional view taken through one of the hydraulic cylinders.

Figure 5 is a top plan view of the hydraulic piston.

Figure 1:
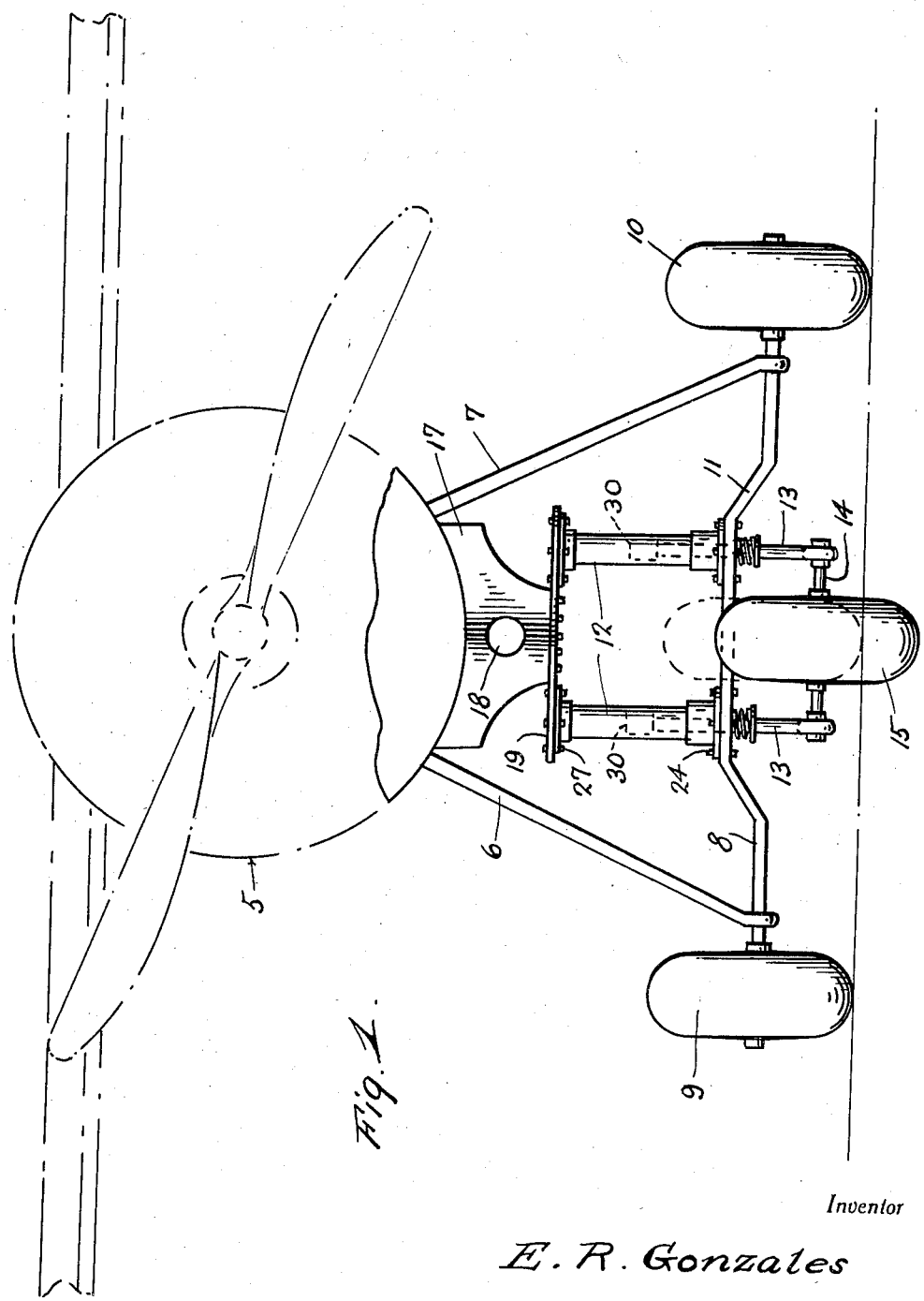
Figure 1 is a general front elevational view of an embodiment of the invention showing the same at the front of the fuselage of an aeroplane, the latter being shown in phantom lines.

Referring in detail to the drawings, the numeral 5 generally designates the fuselage from the lower part of which extend laterally outwardly and downwardly in a conventional arrangement the landing gear braces 6 and 7 whose lower ends have the axle 8 attached thereto, the axle having on its outer ends the pneumatic landing wheels 9 and 10.

In accordance with the present invention the usual stub-axles or the equivalent which are used in present day landing gear are supplemented by the full axle 8 or the equivalent thereof which has an offset portion 11 on opposite ends of which are mounted the transversely spaced vertical hydraulic cylinders 12 which have piston rods 13 extending therefrom and through and below the axle 8 and engaged with the opposite ends of the axle 14 which carries the auxiliary shock absorbing landing wheel 15 which is similar in form to the wheels 9 and 10. As shown in Figure 3 the offset portion 11 has an arcuate brace 16 extending around and behind the auxiliary wheel 15 and connected at its opposite ends to the ends of the offset portion to lend greater strength to the assemblage.

Aiding in supporting the hydraulic cylinders and attaching the same to the fuselage 5 is the L-shaped bracket 17 which has its upper part suitably connected to the underside of the fuselage. The shape of the bracket 17 is clearly shown in Figure 1 and the same will be provided with opening or openings such as that exemplified at 18 to decrease to a minimum the wind-resistance offered thereby.

The bracket 17 has on its lower part the laterally extending flanges 19 which are bolted to the flanges 20 which have the depending cylindrical flange 21 which is interiorly threaded as indicated in Figure 4 to threadedly receive the upper end of the hydraulic cylinder 22. The lower end of the cylinder has an attaching flange 23 which rests on the top of the offset portion 11 of the axle 8 and is bolted thereto by means of bolts 24 which pass through the bolt holes 25. Bolt holes 26 in the flanges 20 receive the attaching bolts 27 which secure the flanges to the lateral portions of the flange or plate 19.

Whether the auxiliary wheel 15 will be carried at a level below that of the wheels 9 and 10 or on the same level, will depend upon the specific arrangements desired, the main or essential condition being that the auxiliary wheel 15 be in a position to absorb the shock ordinarily transmitted to and through the wheels 9 and 10.

The hydraulic piston 30 comprises a suitable block of metal or the like suitable material which has therein a threaded axial bore 31 which receives the threaded stud 32 on the upper end of the piston rod 13 which works through an opening 33 in the bottom of the cylinder as shown in Figure 4. A bolt 34 traverses the upper part of the piston and has a thread opposite to the thread of the stud 32, and is screwed into the upper end of the stud to lock the same with the shoulder 35 engaging the bottom of the piston.

In one side of the piston is a mushroom type or other suitable type valve 36 which extends parallel to the axis of the cylinder and includes a stem 37 which works in a suitable opening in the piston, the passages communicating with the interior of the cylinder 22 at the opposite ends of the piston. The lower part of the valve stem works in an enlarged chamber 38 which encloses a helical spring 39 which is circumposed on the stem within the chamber 38, the spring being held in place by a washer held in position by a cotter pin or the like 40.

At other circumferentially spaced points in the piston 30 pressure regulating passages 41 are arranged with pressure regulating members 42 threaded into their upper ends. The hydraulic resistance of the piston in the cylinder 22 may be adjusted by threading one or more of the members 42 inwardly and outwardly in an axial direction by turning the same. Suitable pressure regulators of this type are conventionally available. Suitable means for filling the interior of the cylinder 22 with a suitable hydraulic fluid such as oil or glycerine, and appropriate means for draining the oil and glycerine therefrom, may be provided without invention.

Although I have shown and described herein a preferred embodiment of my inventiion, it is to be definitely understood that I do not desire to limit the application of the invention, and any change or changes may be made in the materials, and in the structure and arrangement of the parts, within the spirit of the invention and the scope of the subjoined claims.

What is claimed is:—

1. In combination, an aeroplane fuselage including a landing gear comprising a pair of transversely spaced landing wheels, a supplementary landing wheel, a mounting for said wheels, said mounting supporting said pair of wheels at the end thereof and said mounting having an offset intermediate portion within which said supplementary landing wheel is mounted in axial alignment with said pair of wheels, and hydraulically controlled means operatively connecting the supplementary wheel with the fuselage.

2. In combination, an aeroplane fuselage including a landing gear comprising a pair of transversely spaced landing wheels, a supplementary landing wheel, a mounting for said wheels, said mounting supporting said pair of wheels at the ends thereof and said mounting having an offset intermediate portion within which said supplementary wheel is mounted in axial alignment with said pair of wheels, and hydraulically controlled means operatively connecting the supplementary wheel with the fuselage and with said mounting.

3. In combination, an aeroplane fuselage including a landing gear comprising a pair of transversely spaced landing wheels, a supplementary landing wheel, a mounting for said wheels, said mounting supporting said pair of wheels at the ends thereof and said mounting having an offset intermediate portion within which said supplementary wheel is mounted in axial alignment with said pair of wheels, and hydraulically controlled means operatively connecting the supplementary wheel with the fuselage and with said mounting, and means rigidly connecting said mounting with the fuselage.

4. In combination, an aeroplane fuselage including a landing gear comprising a pair of transversely spaced landing wheels, a supplementary landing wheel, a mounting for said wheels, said mounting supporting said pair of wheels at the ends thereof and said mounting having an offset intermediate portion within which said supplementary wheel is mounted in axial alignment with said pair of wheels, and hydraulically controlled means operatively connecting the supplementary landing wheel with the fuselage, said hydraulic means including at least one hydraulic piston working in a hydraulic cylinder.

ESTEBAN R. GONZALES.